Oct. 21, 1930.    F. HEPP    1,779,130
MACHINE FOR ASSEMBLING NEWSPAPERS, PERIODICALS, AND THE LIKE
Filed July 28, 1928    9 Sheets-Sheet 1

Inventor
Friedrick Hepp
by
Franz Reichow
Attorney

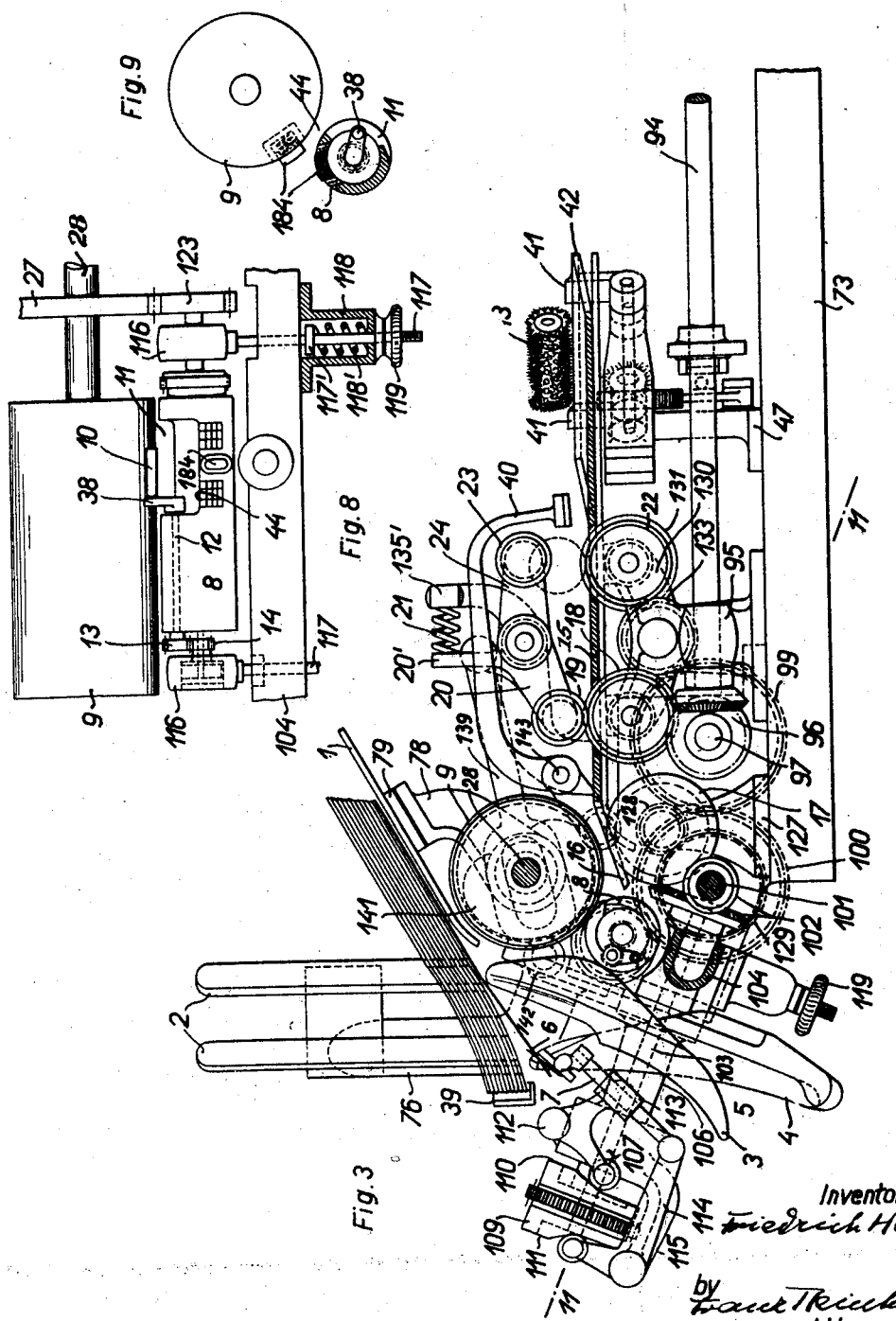

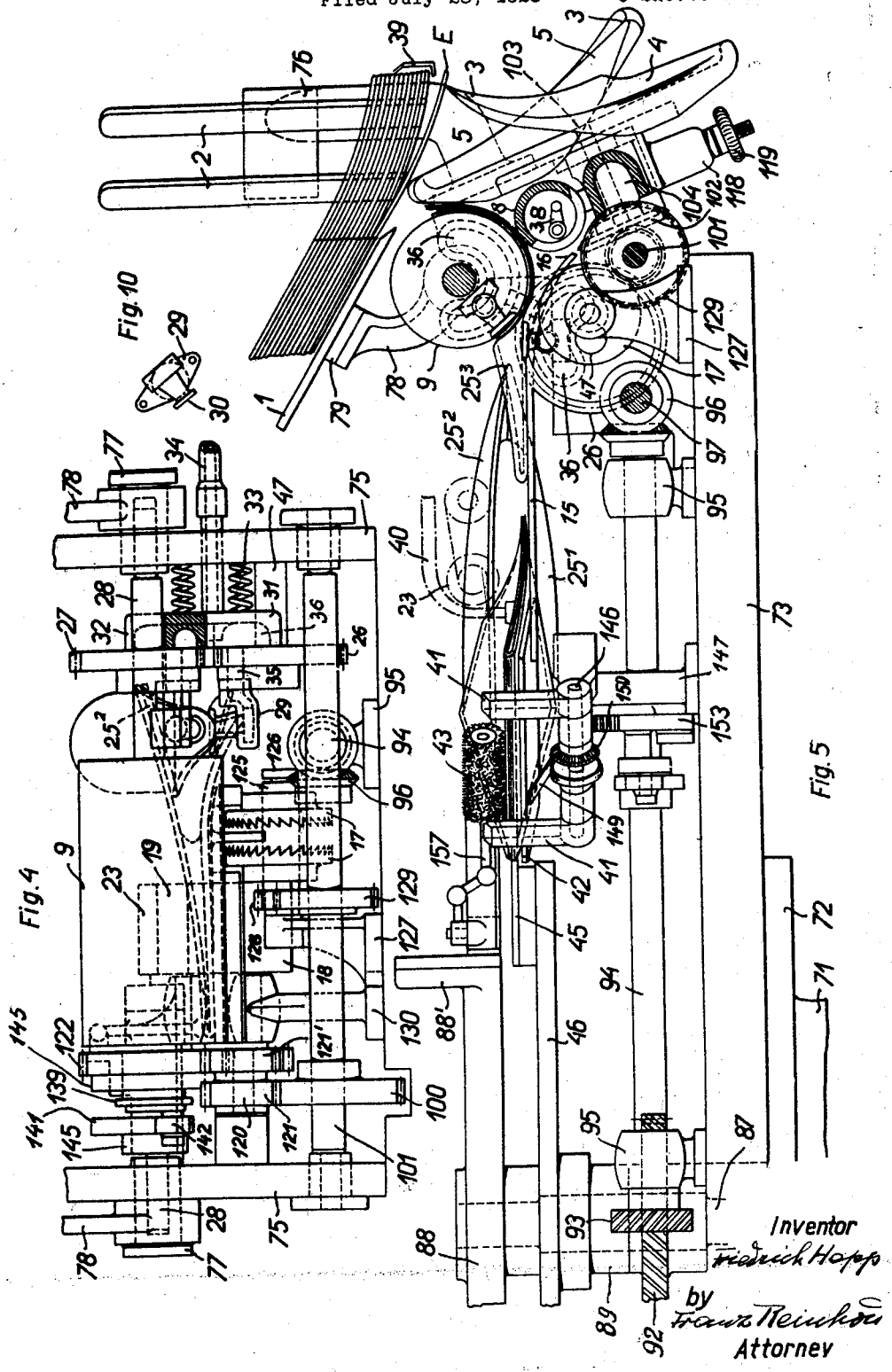

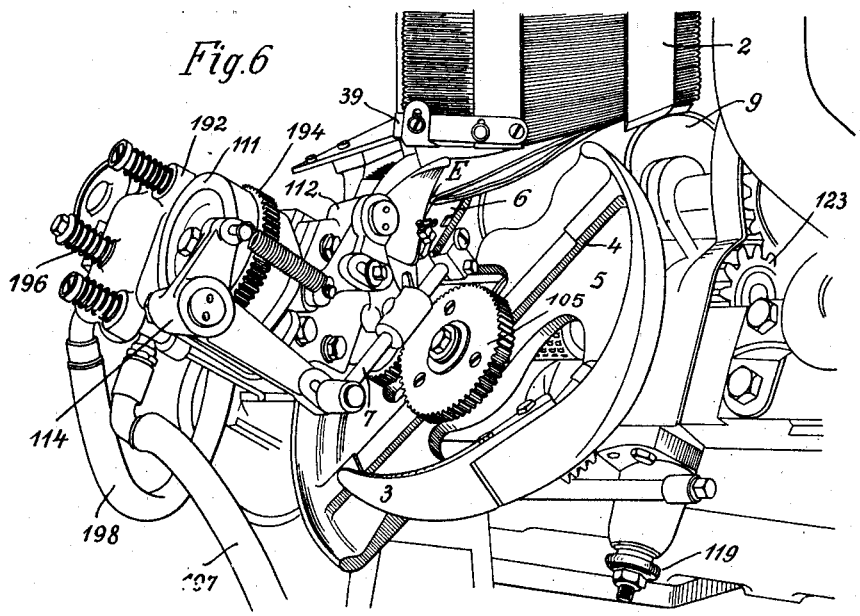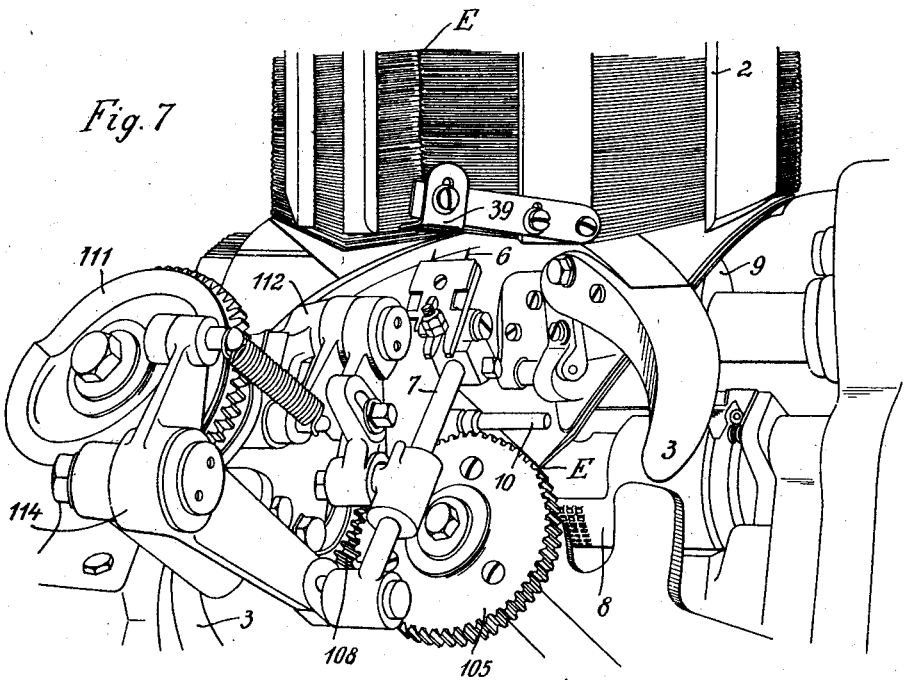

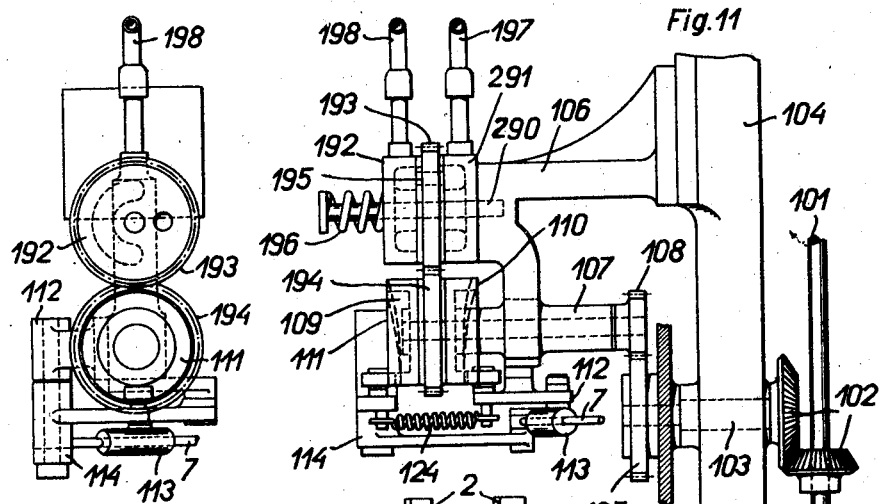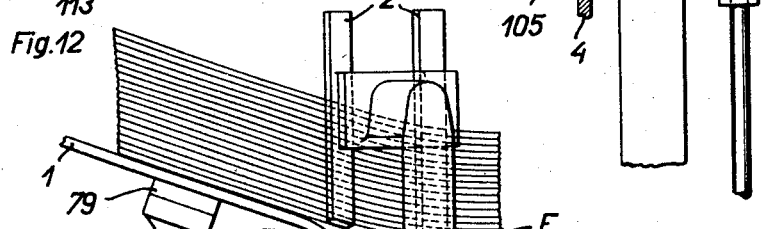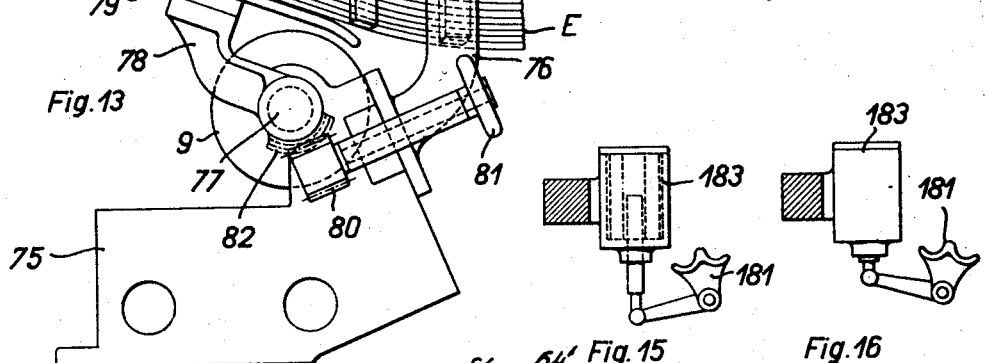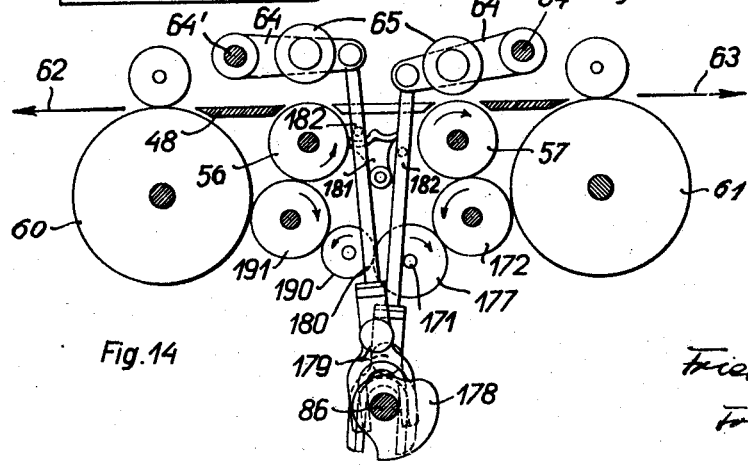

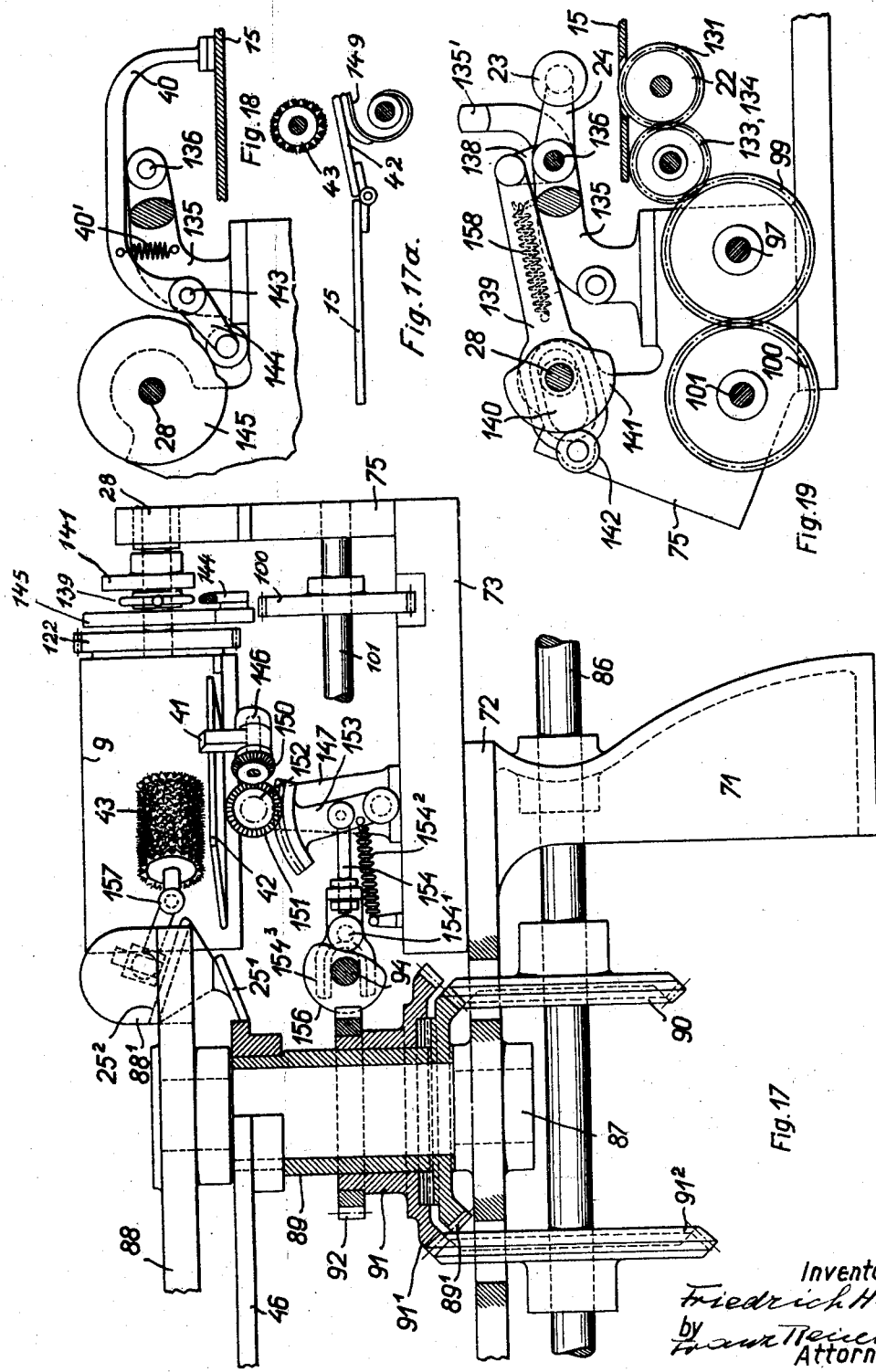

Oct. 21, 1930.  F. HEPP  1,779,130
MACHINE FOR ASSEMBLING NEWSPAPERS, PERIODICALS, AND THE LIKE
Filed July 28, 1928  9 Sheets-Sheet 8

Inventor
Friedrich Hepp
by Frank Teichrod.
Attorney

Oct. 21, 1930.  F. HEPP  1,779,130
MACHINE FOR ASSEMBLING NEWSPAPERS, PERIODICALS, AND THE LIKE
Filed July 28, 1928  9 Sheets-Sheet 9

Inventor
Friedrich Hepp
by Frank Neinlow
Attorney

Patented Oct. 21, 1930

1,779,130

UNITED STATES PATENT OFFICE

FRIEDRICH HEPP, OF BARMEN-WICHLINGHAUSEN, GERMANY

MACHINE FOR ASSEMBLING NEWSPAPERS, PERIODICALS, AND THE LIKE

Application filed July 28, 1928, Serial No. 296,065, and in Germany November 5, 1925.

My invention relates to improvements in machines for assembling newspapers, periodicals, and the like, and more particularly in machines in which one or more folded sheets of paper are inserted one into the other by means of a blade passed into one doubled sheet and engaging the same at its fold and inserting the same into another folded sheet. My improved machine comprises a plurality of means for supporting piles of folded sheets to be assembled, means for successively taking sheets from the said piles, and at least one blade for inserting the sheets taken from the said piles into each other and taking the same to apparatus for removing the assembled sheets from the machine. One of the objects of the improvements is to reduce the friction of a sheet being taken from the pile on the next sheet of the pile, and with this object in view my invention consists in providing a member adapted to be passed between the said sheets before taking a sheet from the pile. Another object of the improvements is to reduce the friction of the sheets being inserted into each other, and with this object in view my invention consists in inserting a pair of blades into the first sheet intended to have a second sheet inserted therein, which blades engage the inner opposing sides of the first folded sheet while inserting the second sheet, so that the said second sheet does not engage the said opposing faces. Other objects of the improvements will appear from the following description of the invention.

For the purpose of explaining the invention several examples embodying the same have been shown in the accompanying drawings in which the same letters of reference have been used in all the views to indicate corresponding parts. In said drawings, Fig. 1, is an elevation of the machine partly in section, taken on the line 1—1 of Fig. 2, Fig. 2, is a top plan view of the machine some of the parts being omitted, Fig. 3, is a sectional elevation on an enlarged scale taken on the line 3—3 of Fig. 2 and looking in the direction of the arrows, Fig. 4, is a detail sectional elevation taken on the line 4—4 of Fig. 2, Fig. 5, is a sectional elevation taken on the line 5—5 of Fig. 2, Figs. 6 and 7, are perspective views showing the mechanism for taking a folded sheet from the pile, Fig. 8, is an elevation partly in section showing the rollers receiving the folded sheet taken from the pile, Fig. 9, is an end view of the said rollers partly in section, Fig. 10, is a detail view showing one of the sheet sucking members, Fig. 11, is a sectional plan view taken on the line 11—11 of Fig. 3, Fig. 12, is an end view of Fig. 11 looking from the left, Fig. 13, is an elevation showing the apparatus supporting the pile of sheets, Fig. 14, is a sectional elevation taken on the line 14—14 of Fig. 1 and looking in the direction of the arrows, Figs. 15 and 16, are detail views showing a part shown in Fig. 14 in different positions, Fig. 17, is a sectional elevation on an enlarged scale taken on the line 17—17 of Fig. 2, Fig. 17ª, is a detail view showing the hinged part of the table and the brush for lifting the sheet with its fold into assembling position, Fig. 18, is a detail view showing the mechanism for arresting the sheets in position for being engaged by the inserting blade.

Fig. 19, is a detail elevation showing a part of the mechanism for moving a sheet taken from a pile into position for engagement by the inserting blade.

Figure 1:
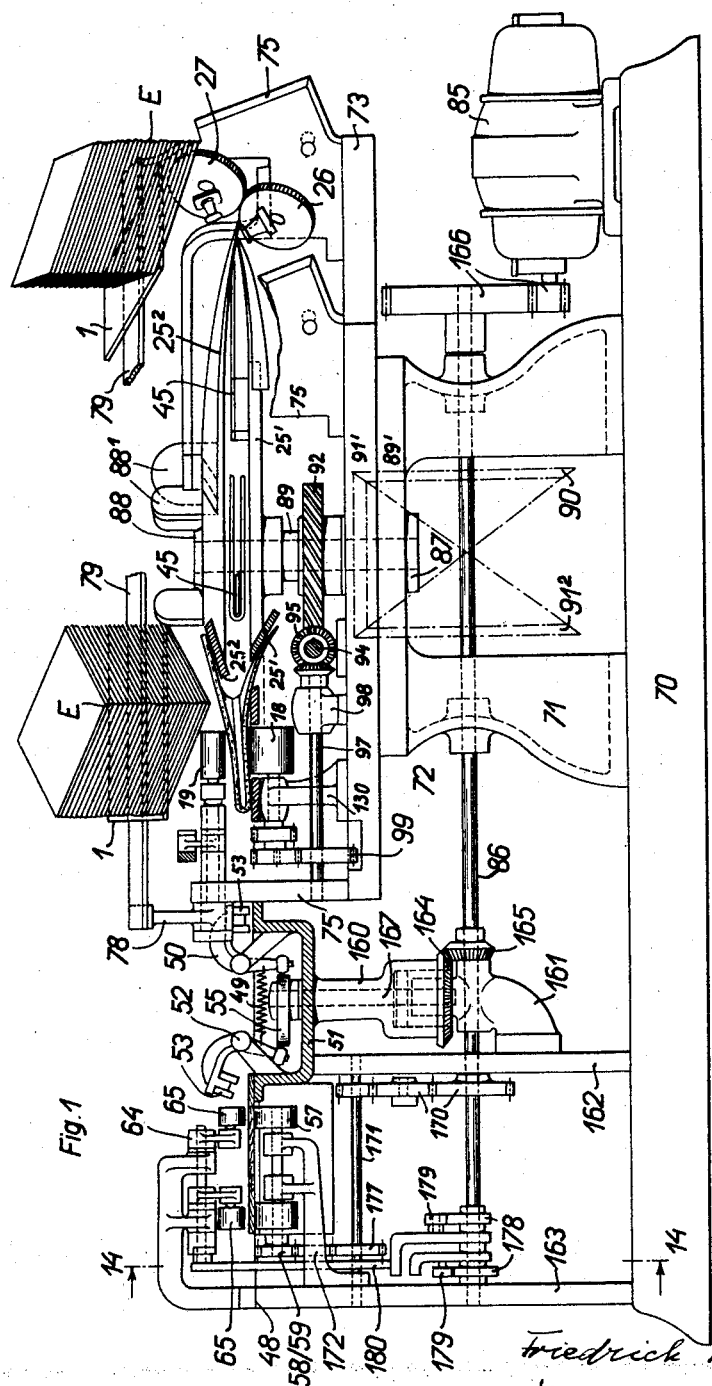

In my improved machine the apparatus for supporting the piles of sheets and for taking the sheets from the said piles may be constructed so that the sheets are taken from the top of the pile. But the said parts may also be arranged so that the said sheets are taken from the bottom of the pile, which construction is preferable for the reason that the sheets can be continuously placed on the top of the pile. In the following I shall describe a machine in which the sheets are taken from the bottom of the pile.

The sheets to be assembled by the machine described hereinafter are folded by two folds disposed perpendicularly to each other, the said folds being termed hereinafter the longitudinal fold produced when once folding a sheet, and a transverse fold produced when folding the said folded sheet a second time. By the two folds a strong corner is produced which has been indicated in the drawings by the letter E. An important feature of my invention consists in so disposing the piles of sheets and passing the sheets from the said piles to the inserting mechanisms that the said corner E is always in advance in the direction of the movement of the folded sheets, the said sheets being removed from the pile and fed to the inserting mechanism in diagonal direction. Thereby various advantages are obtained in the operation of the machine, which will be understood from the following description.

In my improved machine there is a plurality of means for supporting a pile of sheets and for feeding the said sheets into position for engagement by the inserting blade or blades, and the said supporting means and feeding mechanisms are preferably constructed alike, so that a description of one of the said supporting and feeding means is sufficient for a clear understanding of the invention.

For taking a folded sheet from the pile the said sheet is first engaged at the corner E produced by the longitudinal and transverse folds by means for bending the said corner away from the pile, and thereafter the sheet is removed from the pile by means of a kind of peeling operation. Therefore the sheets are disposed in the pile so that the said corner E is located at the outer side of the machine, that is at the side remote from the inserting apparatus. By the peeling operation the sheet is reversed in direction so that the said corner E is directed inwardly and towards the inserting mechanism. In order to permit the sheet to be removed from the pile in the manner described by first bending the front corner E downwardly, the said pile is supported at its bottom mainly on the end of the sheet opposite to the corner E, an inclined plate 1 being provided for thus supporting the pile, the said plate being mounted so that its inclination can be varied according to the character of the sheets. In addition to the said plate rods 2 are provided for supporting the pile, the said rods providing an open framework. The said rods are fixed to arms 76 secured to lateral members 75 of the frame of the machine, which members will be described hereinafter. Further, the pile is supported near the corner E of the lowermost sheet by a small plate 39.

For removing the lowermost sheet from the pile a horn 3 is provided, which is adapted to be passed between the lowermost sheet and the pile, the said horn being passed between the said parts from the side of the transverse fold of the sheet, that is from the side where the sheet presents a single rigid fold. In the construction shown in the figures the said horn is fixed to or made integral with a rotary disk 4, the said disk being provided with two horns 3 helically projecting from the body of the disk forwardly and located in front of a cut-out portion 5. By the rotation of the said disk the horn 3 engages between the lowermost sheet and the pile as is shown in Fig. 6, and by reason of its helical shape the horn engages the sheet near the front corner E thereof, and its inner part is gradually shifted rearwardly on the transverse fold. Finally the disk engages the face of the sheet with its rear side, which is finally bent downwardly about the front edge of the plate 1 in the manner indicated in Fig. 7. From this operation one of the advantages of the diagonal position of the sheets will be understood, the horn engaging, by said diagonal position, the strong transverse fold of the sheet and being shifted thereon inwardly.

By supporting the pile at its inner side only on the plate 1 the outer part thereof and the corner E of the lowermost sheet tend to bend downwardly thus producing a gap between the sheet and the pile for inserting the horn 3. But in order that the horn may be safely inserted I provide means for positively bending the lowermost sheet downwardly and away from the second sheet. Various means may be provided for this purpose, for example such means which act by suction and engage the bottom part of the lowermost sheet by means of a vacuum. In the figures I have shown an arm 7 carrying needles 6 and adapted to be moved in the manner to be described hereinafter so that its needles are moved through a closed curve of more or less elliptical form. By reason of the said movement the needles are first inserted into the lowermost sheet, and thereafter they are moved away from the pile and rearwardly, so as to bend the corner E of the said sheet downwardly and rearwardly and to permit the horn 3 to engage between the lowermost sheet and the pile. In Fig. 6 I have shown the arm 7 and the needle 6 in the positions in which the lowermost sheet has been bent downwardly, and in which the horn 3 is about to be passed between the said lowermost sheet and the pile. By supporting the lowermost sheet on the plate 1 and in addition on the outer margin of the disk 4 located in front of the cut-out portion 5, it is held in position so that the needles can be safely inserted. By the horn 3, and more particularly by the inner margin and the rear face thereof, the corner E of the sheet is first directed downwardly, whereupon it is directed towards two feed rollers 8 and 9 by the rear face of the disk 4, the said rollers bending the corner E inwardly and moving the sheet toward the middle of the machine, while peeling the lowermost sheet away from the pile. As appears from Fig. 5, the axes of the said rollers are located in an inclined plane. For safely inserting the corner E between the feed rollers a finger 10 is provided which is movable within a recess 11 of the roller 8, as is shown in Figs. 8 and 9. The said finger is fixed to a crank 38 mounted on a shaft 12 rotatable in a bore of the roller 8. To the outer end of the said shaft a planet gear wheel 13 is secured which is in mesh with a stationary gear wheel 14. Thus, upon rotation of the roller 8 the finger 10 describes a circle, and it is moved out of the recess 11 at the proper time and into the path of the downwardly directed corner E of the sheet. Thus the said corner is first bent by the finger 10 into the recess 11 of the roller 8, whereupon it is engaged between the edge 44 of the roller 8 and the roller 9.

This operation illustrates another advantage of the diagonal position of the sheet, because thereby the sheet is securely engaged by the finger at its corner E and inserted with its corner E ahead between the rollers 8 and 9.

After the sheet has been engaged by the rollers 8 and 9 it is peeled from the pile by the said rollers. Now, the next sheet of the pile might be carried along by the lowermost sheet by reason of the humidity of the print, the electric charge, and the gravity of the pile bearing thereon. But in my improved machine the next sheet can not be carried along by reason of the horn disk 4 and the proper inclination of the plate 1, the said disk being passed with its horn between the first and second sheets and bearing with its outer margin on the bottom face of the second sheet. By reason of the helical form of the horn the point of support of the pile on the margin of the disk is gradually shifted from the corner E inwardly to the point shown in Fig. 3, and the outer margin gradually lifts the pile slightly, so that the front part of the plate 1 is relieved from the gravity of the pile, and the said pile bears on the plate 1 only with its rear corner remote from the corner E. Therefore the lowermost sheet is clear of the pile almost with its whole surface, and as it is peeled off, it is removed from the pile without carrying along the next sheet. By setting the plate 1 in the proper inclined position the pile is mainly supported on the disk 4 while removing the lowermost sheet.

The corner E of the sheet leaving the rollers 8 and 9 is inclined downwardly and towards the middle of the machine, and it is now bent upwardly and placed on a horizontal table 15. This table extends from the rollers 8, 9 to the median part of the machine, and it is bent downwardly at its intake end, as is shown in Fig. 3 at 16. The downwardly bent portion 16 of the table is formed with a cut-out portion accommodating two rotary disks 17 formed at their opposing faces with teeth and adapted to engage the corner E of the sheet between the same and to lift the said corner on the inclined portion 16 from whence the sheet is conducted on the table 15. Now the corner E of the sheet is first engaged by two feed rollers 18 and 19. The roller 18 is mounted in fixed bearings, while the upper roller 19 is mounted on a lever 20 acted upon by a spring 21 tending to hold the roller 19 in engagement with the sheet. Thus the upper roller 19 is yieldingly pressed on the roller 18 or the sheet moving between the two rollers. At the rear of the rollers 18 and 19 or, in Fig. 3, at the right of the said rollers, there are feed rollers 22 and 23 which likewise have the function of feeding the sheet across the table 15. The lower roller 22 is mounted in fixed bearings, while the upper roller 23 is mounted on a bell crank lever 24 adapted to be temporarily lifted for releasing the sheet.

While the folded sheet moves across the table 15 it must be split, that is its folded halves must be separated from each other, in order that the inserting blade may pass into the split sheet without friction, and the said sheet may be inserted into a second similarly split sheet without friction.

Figure 2:
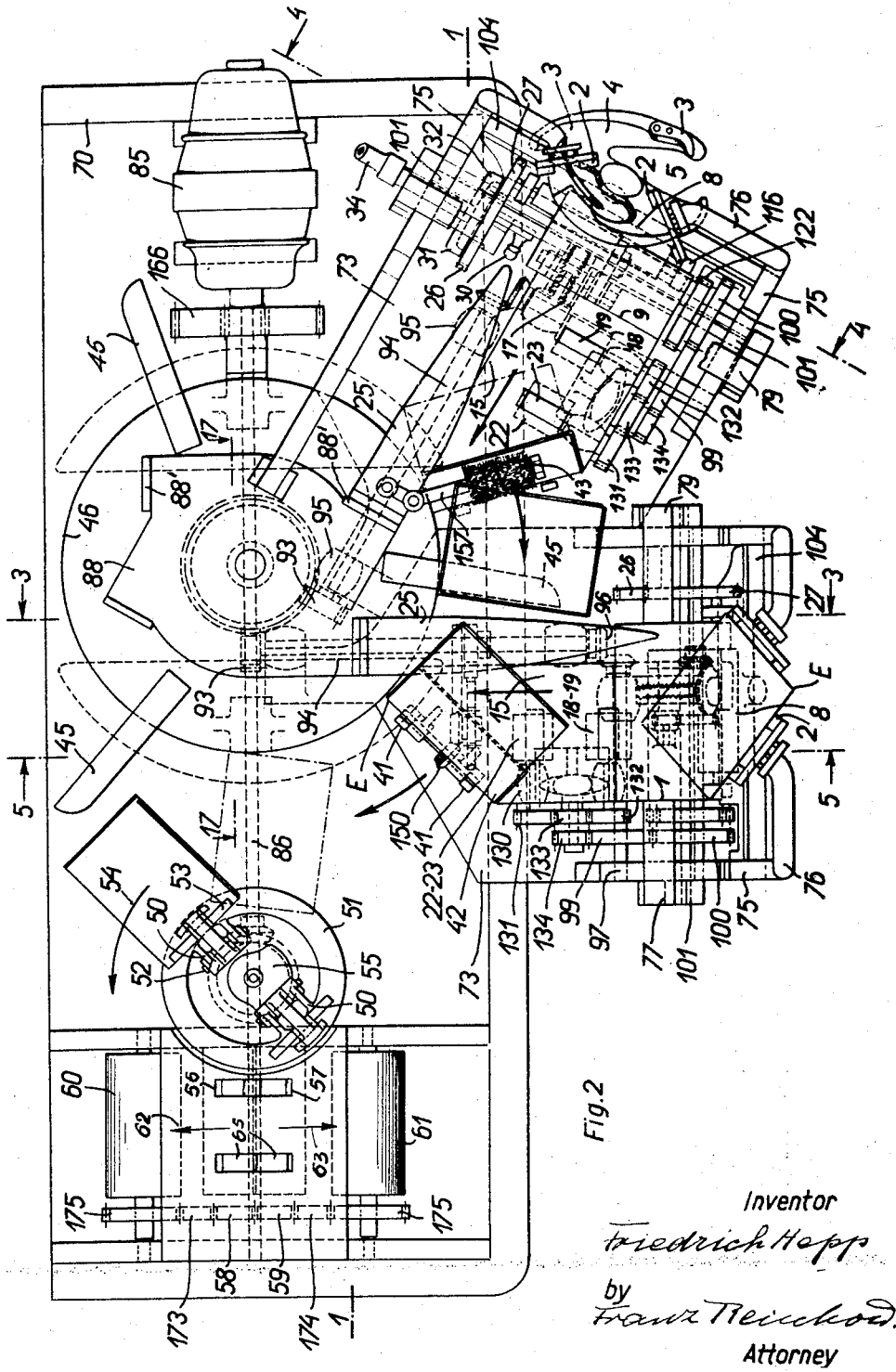

For splitting the sheet a splitting blade 25 is provided which is located at one side of the path of the corner E of the sheet. In the construction as seen in Fig. 2, the splitting blade is located at the right of the said corner. Further, for splitting the paper means are provided in front of the splitting apparatus for separating the right hand corners of the sheet from each other before moving the same on the splitting blade. Various means may be used for this purpose. In the example shown in the figures rotary members acting by suction have been provided for this purpose.

The means for separating the right hand corners of the sheet from each other are disposed on two meshing gear wheels 26 and 27 located at the right of the roller 9 (Figs. 2 and 4). The gear wheel 26 is rotatable on a bolt 47, and the gear wheel 27 is fixed to a shaft 28 carrying the roller 9 and adapted to impart rotary movement to both gear wheels. At the left hand side (Fig. 4) of each gear wheel there is a suction head 29 (cf. Figs. 5 and 10) having a mouth 30 directed radially outwardly, the said suction heads being disposed so that they are adapted simultaneously to engage the right hand corner of the sheet travelling past the gear wheels 26 and 27 and to separate the halves by vacuum. The right hand faces of the gear wheels 26 and 27 are smoothly finished, and they are engaged by hollow slide valves 31 and 32 adapted to be pressed on the faces of the gear wheels by springs 33 and connected by a flexible tube 34 with an air pump or the like. The bores 35 of the suction heads extend through the body of the gear wheels and into position for communicating with the cavities of the slide valves 31 and 32 at the proper moment. As appears from Fig. 5, the cavities 36 of the slide valves are segmental in shape, and they extend over a part of the circumference of the gear wheels. Fig. 5 shows the suction heads beginning to separate the corners of the sheet from each other.

The outer point $25^3$ of the splitting blade 25 is located at the point where the right hand corners of the sheet have been separated from each other by the suction heads (Fig. 5). The splitting blade consists of two flat bars $25^1$ and $25^2$ located one above the other and merging at their outer ends into the point $25^3$. Further, the flat bars $25^1$ and $25^2$ are inclined relatively to each other in transverse direction, as is shown in Fig. 1, according to the form of the sheet to be split. At their outer end $25^3$ the bars $25^1$ and $25^2$ are connected with each other, and they flare outwardly towards the middle of the machine thus providing an elongated passage for the inserting blade and the sheets to be inserted one into the other.

The sheet fed by the rollers 8, 9, and the disks 17 are brought into position with their right hand corners between the suction heads 29, 30 and from thence on the point of the splitting blade 25. When being further moved the parts of the sheet are completely split, so that the splitting blade 25 is finally located between the parts of the sheet. Now another advantage of the diagonal movement of the sheet will be understood, the sheet being split beginning at one corner, while it is advanced at the opposite side of the corner E by the feed rollers 18, 19 and 22, 23.

After the sheet has been advanced by the rollers 18, 19 and 22, 23 in a direction which is substantially radial with respect to the vertically standing king-bolt 87, of which further mention will be made, and split by the blade 25, it is temporarily arrested, in order to permit two sheets to be inserted one into the other and to compensate inaccuracies of the movement of two or more sheets to be assembled. For this purpose arresting means are provided, so that the corner E of the sheet is advanced to a definite point, and corresponding sheets can be inserted exactly in the proper positions. Further, means are provided for slightly lifting the sheet away from the table, in order that the inserting blade exactly engages the fold of the sheet, and assembles consecutive sheets so that the folds of the sheets engage each other.

For arresting the sheet arriving at the end of its radial movement an arm 40 is provided, which is located above the left hand portion of the sheet and is lowered at the proper moment on the said sheet. Simultaneously the upper roller 23 is lifted for interrupting the feed of the sheet.

For exactly positioning the sheet two fingers 41 are provided, which are adapted to be rocked into the path of the sheet being placed with its transverse fold against the said fingers, as is indicated in Figs. 2 and 5. Simultaneously a hinged flap 42 ordinarily located in the plane of the table 15 is rocked upwardly so far that the fold gets exactly into the correct position relatively to the front edge of the inserting blade. The lifting device for the said flap is elastic, so that the flap can yield when the inserting blade and the sheet move across the same. Above the flap there is a cylindrical brush 43 rotatably mounted on a horizontal axis and preventing the sheets from being lifted too far.

Now the radial movement of the sheet is finished.

As has been stated above, for each pile of sheets a radial feed mechanism is provided, and all the feed mechanisms are similar in construction. Therefore, all the sheets are distributed in exactly corresponding positions around the vertical axis of the machine.

In the example shown in the figures for inserting the sheets three substantially radial inserting blades 45 are provided, which are fixed to a disk 46 rotatably mounted on a vertical shaft or king-bolt 87 disposed axially of the machine. In the position of the parts shown in Fig. 2 one of the inserting blades has just taken the folded sheet coming from the right hand pile, and it is about to move the said sheet through a circumferential path to a folded sheet advanced by the left hand feed mechanism. In this operation the inserting blade has first been moved between the bars $25^1$ and $25^2$ of the right hand splitting blade, and now it advances the sheet between the splitting bars $25^1$ and $25^2$ of the left hand splitting blade and into the sheet placed thereon. The movement of the inserting blade into the first sheet, and the movement of the first sheet into the second sheet is effected substantially without any friction, because the sheets are held apart by the splitting blades, and neither the inserting blades slides on the inner face of the first sheet, nor the first sheet slides on the inner face of the second sheet. Therefore the operation of the machine is not interfered with by friction of the sheets of paper on each other even in case of rapid operation.

When the inserting blade engages the transverse fold of the first sheet and advances the same in circumferential direction the elastically supported flap 42 yields downwardly, and, simultaneously, the fingers 41 are rocked downwardly, so that they do not interfere with the circular movement of the sheet.

Now the assembled sheets are fed to a mechanism for depositing the same from the machine, which mechanism is shown in Figs. 1 and 2 at the left hand part of the machine. The depositing mechanism comprises grippers 50, adapted to engage the sheet at the proper moment and having a circular velocity greater than the velocity of the inserting blade 45, so that they are adapted to remove the sheet from the said blade in forward direction.

The grippers 50 are mounted on a rotary drum 51 having a vertical axis, and they are rockingly supported on pivot bolts 52. The outer ends of the said grippers are equipped with blocks 53 of rubber or the like, which are adapted to bear on the sheet brought into depositing position by the blade 45 and to press the same on the margin of the drum 51. Now the sheet is carried along by the drum in the direction of the arrow 54 shown in Fig. 2. The inner ends of the grippers 50 carry antifriction rollers engaging a stationary cam disk 55 of the form shown in Fig. 2, and they are normally held in engagement with the spring by a spring 49. By the said spring the grippers 50 are rocked downwardly when they are above a sheet supplied by the inserting blade, and they are lifted again by the cam disk when the sheet removed from the inserting blade in the direction of the arrow 54 arrives on the outer side of the drum 51.

On the outer side of the drum 51 two pairs of feed rollers 56 and 57 are provided which project through slots made in a table 48, and which are adapted to be rotated in opposite directions by means of gear wheels 58 and 59 secured to the shafts of the rollers. Further, feed rollers 60 and 61 are provided, which cooperate with the feed rollers 56 and 57 for carrying the assembled newspaper in one or the other direction, the feed rollers 56 and 60 being rotated in a direction for carrying the newspaper in the direction of the arrow 62, and the rollers 57, 61 being rotated in a direction for carrying the newspaper in the direction of the arrow 63 (Figs. 2 and 14). Above the rollers 56 and 57 rollers 65 are mounted on levers 64 rockingly mounted on pivot bolts 64$^1$, the said rollers 65 being adapted to be alternately pressed on the rollers 56 and 57 or the newspaper placed thereon. Thereby the newspaper is adapted to be carried either in the direction of the arrow 62 or in the direction of the arrow 63. The levers 64 may be operated either by hand or by automatic means. Their object is to transport the regularly assembled newspapers to one side and the irregular or injured newspapers to the opposite side.

The regularly assembled newspapers may pass thence to other mechanism, as for example a counting mechanism.

The aforesaid parts of the machine are disposed on a frame which is mounted on a base plate 70. To the said base plate uprights 71 are fixed which are connected at their top ends by a horizontal circular plate 72. To the plate 72 plates 73 are screwed one for each of the piles of sheets and the radial feeding mechanism thereof. To opposite sides of the outer ends of the said plates the aforesaid cheeks 75 are fixed which provide supports for various parts of the operating mechanism. To the outer end faces of the said cheeks the arms 76 are fixed which carry the rods 2. Further, cylindrical bushings 77 are mounted in bores of the said cheeks, and on the said bushings arms 78 are rockingly mounted which are connected at their top ends by a rail 79 having a plate 1 supporting the pile fixed thereto. Thus, by rocking the arms 78 on the bushings 77 the plate 1 is inclined more or less. Any suitable operating mechanism may be provided for thus rocking the arms 78. In the example shown in detail in Fig. 13 one of the arms 78 is provided with a toothed segment 82 engaged by a worm 80 connected with a hand wheel 81, the pitch of the said worm being such that it is adapted to hold the arms 78 in set positions.

The various mechanisms of the machine are operated from an electromotor 85 mounted on the base plate 70, the shaft of the said motor being connected by gear wheels 166 with a shaft 86 disposed longitudinally of the machine. To the plate 72 a king-bolt 87 is fixed which carries a hood 88 at its top end. To arms 88$^1$ rising from the said hood the splitting blades 25 are fixed. As appears more particularly from Fig. 17, on the king-bolt 87 a sleeve 89 is rotatable to the top end of which the disk 46 is fixed. At its bottom end the sleeve is made integral with a bevel gear wheel 89$^1$ engaged by a bevel gear wheel 90 keyed to the shaft 86. On the sleeve 89 a sleeve 91 is rotatable which is made integral with a bevel gear wheel 91$^1$ meshing with a bevel gear wheel 91$^2$ keyed to the shaft 86. To the top end of the sleeve 91 a helical gear wheel 92 is secured which is adapted to impart rotary movement to the mechanisms for taking sheets from the piles and transporting the same in radial direction. The helical gear wheel is engaged by helical gear wheels 93 fixed to shafts 94 disposed substantially radially of the machine and mounted in bearings 95 rising from the plates 73. At its outer end each shaft 94 is connected by a bevel gearing 96 with a transverse shaft 97 mounted in a bearing 98 and in the left hand cheek 75, as is best shown in Fig. 1. To the shaft 97 a gear wheel 99 is keyed which is in mesh with a gear wheel 100 keyed to a transverse shaft 101 mounted in the cheeks 75 (Figs. 2 and 4). The shaft 101 is connected by a bevel gearing 102 with an inclined shaft 103 rotatably mounted in a transverse bridge 104 fixed to the cheeks 75 (Figs. 3, 5 and 11). In front of the disk 4 a spur gear 105 is secured to the shaft 103 from which the needle bar 7 is operated, the operating mechanism being best shown in Fig. 11. To the bridge 104 a bracket 106 is fixed which provides a bearing for a shaft 107 carrying a gear wheel 108 meshing with the gear wheel 105. Further, a cam disk 109 is keyed to the shaft 107, and the said cam disk is provided at both faces with a cam 110 and 111. The inner cam face 110 is engaged by a bell crank lever 112 rockingly mounted on the bracket 106 and having a sleeve 113 pivotally mounted thereon (Figs. 3, 7, 11 and 12). In the said sleeve 113 the needle bar 7 has reciprocating movement. The free end of the needle bar is jointed to a bell crank lever 114 rockingly mounted on an arm 115 of the bracket 106. The bell crank lever bears on the outer cam face 111. The bell crank levers 114 and 112 are connected by a spring 124 tending to hold the same in engagement with the said cam faces.

By the cam face 111 and the bell crank lever 114 the inward movement is imparted to the rod 7 and the needles 6, while the cam face 110 and the bell crank lever 112 move the rod 7 in transverse direction, the said movements being combined into the aforesaid more or less elliptical movement of the needles 6.

As is shown in Fig. 8, the bearings 116 of the roller 8 are elastically supported by means of rods 117 guided in bores of the bridge 104 and in a tubular bearing member 118 fixed to the said bridge, the said bearing member enclosing a spring 118' acting on a collar 117' of a rod 117. By means of a nut 119 screwing on the rod 117 the roller 8 can be adjusted towards and away from the roller 9.

The roller 9 cooperating with the roller 8 is fixed to the shaft 28 guided in axial bores of the sleeves 77, as is best shown in Fig. 4.

The rollers 8 and 9 are driven from the transverse shaft 101, and more particularly from the gear wheel 100 keyed thereto. The gear wheel is in engagement with a pinion 121 loosely mounted on a short shaft 120 fixed to one of the cheeks 75, the pinion 121 being made integral with a pinion 121¹ meshing with a gear wheel 122 keyed to the shaft 28 (Fig. 4). To the shaft 28 the gear wheel 27 carrying one of the suction heads 29 is keyed, which is in mesh with the gear wheel 26 carrying the second suction head. Further, the gear wheel 27 is in mesh with a gear wheel 123 keyed to the shaft of the roller 8.

The toothed disks 17 by means of which the downwardly directed corner E of the sheet is elevated and placed on the inclined portion 16 of the table 15 are fixed to a sleeve 125 rotatably mounted on a bolt 126 fixed to a bearing 127 rising from the plate 73, as is best shown in Figs. 3 and 4. To the said sleeve a gear wheel 128 is fixed, which is in mesh with a gear wheel 129 keyed to the shaft 101. Thus the disks 17 are directly driven from the transverse shaft 101 by means of the gear wheels 129 and 128.

The lower feed rollers 18 and 22 are mounted on a bearing member 130 fixed to the plate 73, and on their shafts gear wheels 131 and 132 are keyed which are in mesh with a gear wheel 133. To the axis of the gear wheel 133 a gear wheel 134 is fixed which is in mesh with the gear wheel 99 keyed to the shaft 97 (Figs. 2 and 3).

The rollers 19 and 23 coperating with the rollers 18 and 22 are mounted on a bearing member 135 secured to the left hand cheek 75.

The levers 20 and 24 are rockingly mounted on a bolt 136 carried by the bearing member 135. An arm 20' made integral with the lever 20 is acted upon by a spring 21 bearing on an arm 135' of the bearing member 135, the said spring holding the roller 19 in elastic engagement with a sheet passing between the rollers 19 and 18. The lever 24 is made integral with an upwardly directed arm 138 (Fig. 19) engaged by a link 139. At its opposite end the said link is formed with a longitudinal slot 140 by means of which it is supported on the shaft 28. Laterally of the slotted part of the link a cam 141 is fixed to the shaft 28 which engages a roller 142 carried by the link 139, and a spring 158 attached to the link 139 tends to hold the roller 142 in engagement with the cam 141 and to press the roller 23 on the roller 22 and the newspaper placed thereon. By means of the cam 141 the roller is lifted away from the roller 22 for releasing the newspaper.

The lever 40 for arresting the sheet at the end of its radial movement is rockingly mounted on a bolt 143 fixed to the bearing member 135 (Figs. 3 and 18), and an arm 144 of the said lever engages a cam 145 secured to the shaft 28. A spring 40' tends to rock the lever 40 downwardly and on a sheet of paper.

For rocking the fingers 41 and the flap 42 a shaft 146 is provided which is mounted in a bearing member 147, and which carries the fingers 41 and a spiral spring 149 on which the flap 42 is supported. A bevel gear wheel 150 keyed to the shaft 146 is in mesh with a bevel gear wheel 151 the shaft of which carries a spur gear 152. The spur gear 152 is in mesh with a toothed sector 153 connected with a link 154. The bifurcated end 154³ of the said link bears on the shaft 94, and a cam 156 keyed to the said shaft engages a roller 154¹ mounted on the link 154, a spring 154² tending to hold the roller in engagement with the cam 156 and to rock the toothed sector 153 to the left in Fig. 17.

The brush 43 is loosely mounted on a shaft 157 secured to the upper bar 25² of the splitting blade.

The hub 160 of the drum 51 is rotatable on a bracket 161 fixed to one of a pair of cheeks 162, 163 rising from the base plate 70, and to the said hub a bevel gear wheel 164 is keyed which is in mesh with a bevel gear wheel 165 keyed to the shaft 86. To the bracket 161 a vertical bolt 167 is fixed which is passed upwardly through a vertical bore of the hub 160, and which carries the cam disk 55.

Above the left hand end of the shaft 86 (Fig. 1) a shaft 171 is rotatably mounted in the cheeks 162 and 163, which shaft is adapted to be rotated from the shaft 86 by means of gear wheels 170. To the shaft 171 a gear wheel 177 is secured which is in mesh with a gear wheel 172 meshing with the gear wheel 59, and which is further connected by gear wheels 190, 191 with the gear wheel 58 thus imparting rotary movement in opposite directions to the gear wheels 58 and 59 and the rollers 56 and 57. The gear wheels 172 and 191 are in mesh with gear wheels 177 and 175 connected with the rollers 60 and 61.

The rollers 65 mounted on the levers 64 are controlled by cam disks 178 fixed to the shaft 86 and acting on rollers 179 rotatably mounted on links 180 jointed to the levers 64, springs attached to the links 180 tending to pull the levers 64 and the rollers 65 downwardly and into engagement with the assembled newspapers placed on the rollers 56 and 57.

The links 180 can be thrown out of operation by means of a rocker 181 adapted to engage either one of pins 182 fixed to the links 180. When setting the rocker 181 into the position shown in Fig. 14 it lifts the left hand roller 65, while it permits the right hand roller 65 to be operated by its cam disk 178 for engaging a newspaper placed on the roller 57 and carrying the same in the direction of the arrow 63.

The rocker 181 is adapted to be set in either position by means of an electromagnet 183 the circuit of which is controlled by a pair of cooperating contacts 184 provided in the machine. In the example shown in the figures the said contacts are provided on the rollers 8 and 9, and ordinarily they are prevented from closing the circuit by a sheet passing between the rollers 8 and 9. If, however, the operating mechanism has failed to take a sheet from one of the piles, the circuit is closed by the terminals 184, and the electromagnet 183 is energized thus rocking the rocker 181 into the position shown in Fig. 16. Now the right hand pair of rollers 57 and 65 is inoperative, and the left hand pair of rollers 56 and 65 is operative for carrying the newspapers in the direction of the arrow 62. Immediately thereafter the circuit is interrupted by the terminals 184 being separated from each other. Therefore the machine is immediately ready to carry the next newspaper in the direction of the arrow 63.

In the machine so far described the corner E of the folded sheet is bent downwardly by means of needles 6. In lieu of the needles I may make use of suction heads carried by the arm 7 in lieu of the needles and adapted to bend the corner E downwardly by suction, in the manner described with reference to the suction heads 29, 30. Further, in the same machine needles and suction heads may be provided. The machine shown in the drawings is provided both with needles and suction heads to be alternately used.

The mechanism controlling the operation of the suction heads is constructed as follows:

To the bracket 106 carrying the cam disk 109 a bolt 290 is fixed (Fig. 11) on which two non-rotatable valves 291 and 192 are mounted, which slide valves are formed with cavities. Between the slide valves a gear wheel 193 is rotatable on the bolt 290, which gear wheel is in mesh with a spur gear 194 made integral with the cam disk 109. The cavities of the slide valves 291 and 192 are adapted to be thrown into communication through a bore 195 extending transversely through the gear wheel 193. The slide valves 291 and 192 are provided with finished faces engaging the end faces of the gear wheel 193, and they are pressed into tight engagement therewith by springs 196. The slide valves are connected with flexible tubes 197 and 198 connected one with a suction pump or the like, and the other with a suction head adapted to be mounted on the arm 7. At the proper moment the said suction head is connected by the rotary movement of the gear wheel 193 relatively to the slide valves 291 and 192 with the suction pipe, so that it is adapted to retract the corner E of the lowermost sheet from the pile.

Instead of controlling the rollers 65 by means of the circuit including the contacts 184, the said circuit may also be used for throwing the machine out of operation, for removing the irregularity in the operation. Further, the contacts 184 may be provided on other parts of the gearing.

Figure 20:
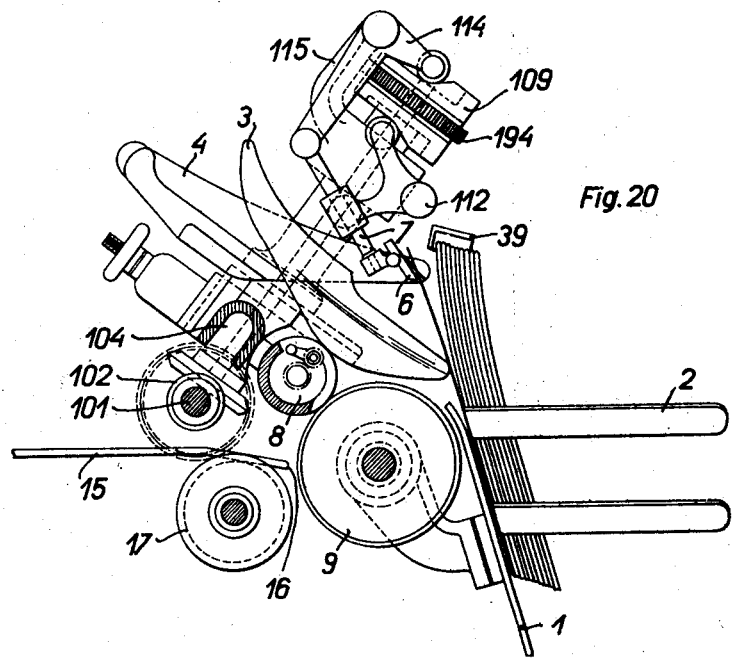
Fig. 20, is a sectional elevation showing a modification.

In Fig. 20 I have shown a modification in which the pile of folded sheets is disposed so that the individual sheets are inclined slightly away from the vertical position. Therefore, the weight of the pile is mainly supported on the bars 2, while the plate 1 is almost completely relieved of the said weight.

Therefore, the sheets are more readily taken from the pile.

The construction of the pile and the parts for peeling and retracting the sheets therefrom are similar in construction as the corresponding parts of the example described with reference to Figs. 1 to 19, except that the relative position is changed. Corresponding parts have received the same reference characters, so that a detailed description may be dispensed with.

Figure 21:
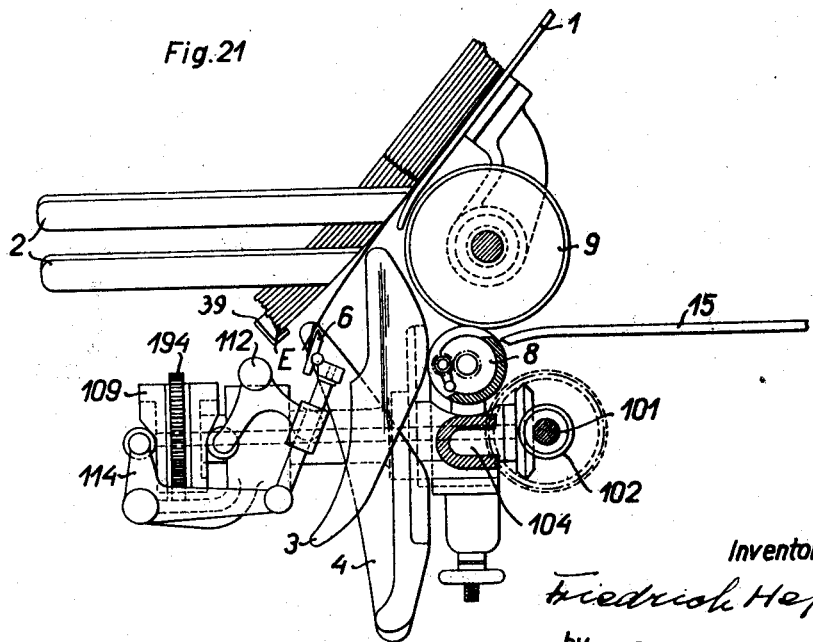
Fig. 21, is a similar sectional elevation showing another modification.

The modification shown in Fig. 21 is distinguished from the construction shown in Fig. 20 in that one of the folds of the sheets assembled into a pile and supported on the plate 1 and the bars 2 is horizontal. Therefore the said folds and the corners E are always located exactly at the same height. I have found that thereby uniform operation of the machine is insured. The bars 2 may be disposed horizontally, as is shown in the figure, or, as shown in Figs. 5 and 6, they may be disposed in approximately vertical position.

As has been stated above, I prefer to dispose the sheets so that they are advanced in diagonal direction. If the sheets are disposed so that the transverse fold is located at the front side of the sheet taken in the direction of the travel I prefer to provide two horn disks 4 and corresponding needles 6 or the like, the horns and needles engaging both front corners of the sheet.

Figure 22:
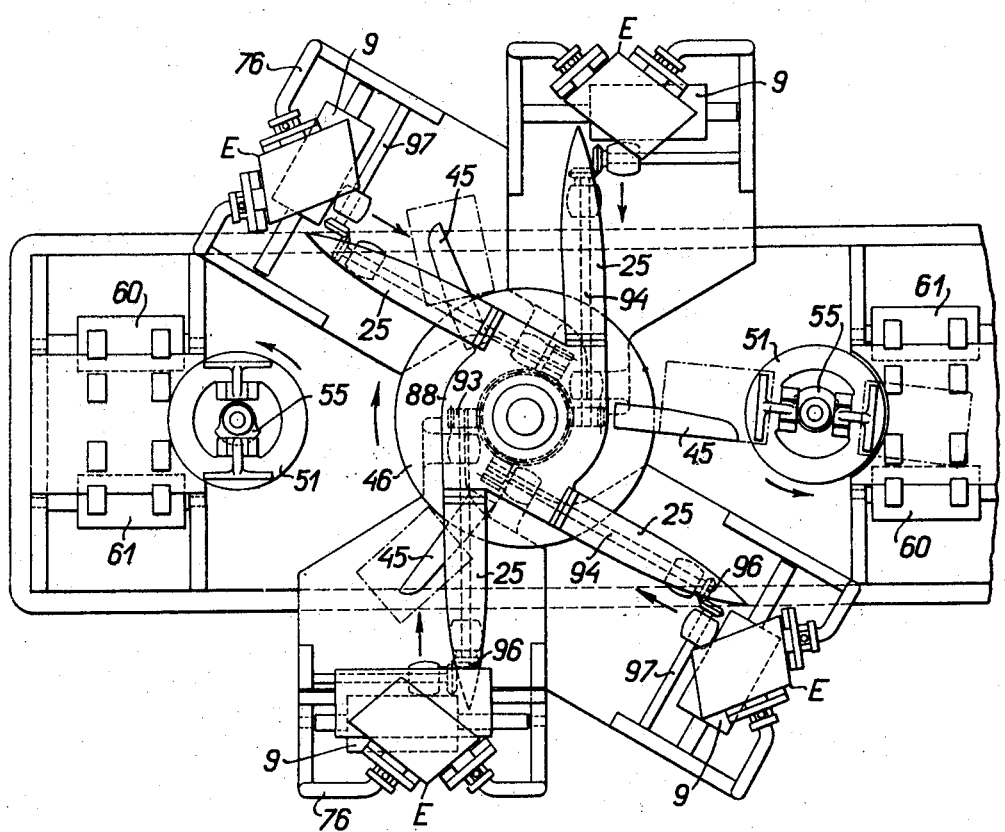
Fig. 22 is a view in plan, corresponding to Fig. 2, and illustrating a duplication of parts.
Figure 23:
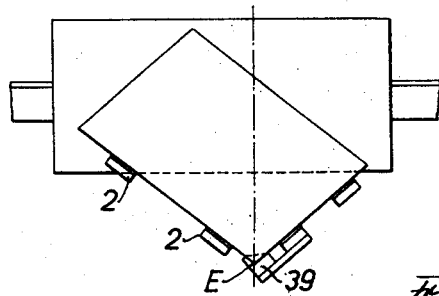
Fig. 23 is a view of the assembly of sheets with their supporting means as seen from the left, Fig. 21.

In the machine as thus far described with reference to Figs. 1 to 19, it is manifest that a second apparatus 51, 55 may be provided, and may be situated on the other side of the king-bolt 87, diametrically opposite to the parts 51, 55 there shown and it is manifest that the apparatus shown in Fig. 2 for moving the sheets may be duplicated on the opposite side of the center king-bolt. Thus, the machine illustrated in the figures may in such manner be caused practically to consist of two machines combined into a single apparatus. In the machine so augmented each blade 45 will cooperate with each pair of sheet feeding apparatus, the said blade assembling pairs of sheets first in one section of the machine and delivering the same to the delivering apparatus, and then assembling similar pairs of sheets in the second set of feeding apparatus and delivering the same to the second delivering apparatus. This is illustrated in Fig. 22; in this figure the parts are indicated by the same reference characters which are used in Fig. 2, and a comparison of the two figures will illustrate the augmentation of the apparatus which has just been described.

If one of the delivering apparatus is thrown out of operation all the sheets are assembled into a single newspaper, so that the machine is a single acting machine assembling the double number of sheets. The inserting blades 45 are disposed on the disk 46 relatively to each other at a distance corresponding to the distance between two sheets following each other, the blades moving along the radial feeding apparatus and at least one of the delivering apparatus.

In the construction shown in the drawings the inserting blades 45 are fixed to the rotary disk 46, which construction is advantageous for the reason that the operating mechanism is simple in construction and reliable in operation. But I wish it to be understood that my invention is not limited to the construction shown in the drawings.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A machine for assembling folded sheets, comprising a plurality of apparatus for supporting piles of the sheets to be assembled, an inserting blade movable alongside said apparatus, means for taking single sheets from said piles and moving the same into the path of said blade, and means located between said apparatus and the path of said blade for separating the folds of each sheet from each other.

2. In a machine for assembling folded sheets, the combination, with apparatus for assembling the sheets, of a frame for supporting a pile of folded sheets, means adapted to engage the sheets near one margin and to remove the same with said margin angularly away from the pile, means adapted to engage the sheet at the margin removed from the pile and to peel the same therefrom, and means for conveying said sheet into assembling position.

3. In a machine for assembling folded sheets, the combination, with apparatus for assembling the sheets, of a frame for supporting a pile of folded sheets, means adapted to engage the sheet near one of its corners and to remove the same with said corner angularly away from the pile, means adapted to engage the sheet at the corner removed from the pile and to peel the same therefrom, and means for conveying said sheet into assembling position.

4. In a machine for assembling folded sheets, the combination, with apparatus for assembling the sheets, of a frame for supporting a pile of folded sheets, means for engaging a sheet placed on said frame near its corner, and means for removing the said sheet from said pile substantially in the direction of its diagonal, and means for conveying the said sheet into assembling position.

5. In a machine for assembling folded sheets, the combination, with apparatus for assembling the sheets, of a frame for supporting a pile of folded sheets, a member adapted to be passed between the outermost sheet and the next one of the pile and to relieve said outermost sheet of the pressure of said pile, and means operative while the pile is being engaged by said member for removing the outermost sheet from the pile, and means for conveying the said sheet removed from the pile into assembling position.

6. In a machine for assembling folded sheets, the combination, with apparatus for assembling the sheets, of a rectangular frame for supporting a pile of folded sheets having a pile supporting member at one of its sides, means adapted to be passed between the outermost sheet and the body of the pile and to relieve the said sheet of the pressure of said pile, means operative while the body of the pile is being engaged by said member for removing therefrom the outermost sheet, and means for conveying the said sheet into assembling position.

7. In a machine for assembling folded sheets, the combination, with the assembling apparatus, of a frame for supporting a pile of folded sheets comprising a bottom plate in position for supporting the pile at one side, means for varying the inclination of said plate, a member adapted to be passed between the first folded sheet directly supported on said plate and the body of the pile and to relieve the said sheet directly lying on the plate of the pressure of the pile, and means to remove the said sheet from the pile and to convey the same to the said assembling apparatus.

8. In a machine for assembling folded sheets, the combination, with the assembling apparatus, of a frame for supporting a pile of folded sheets, a rotary disk disposed with its plane transversely of the sheets being piled on said supporting means and provided with a cut-out portion and a horn helically projecting from the body of the plate into position for being inserted upon rotation of the disk between the first sheet adjacent thereto and the body of the pile and to relieve said sheet of the pressure of the body of the pile, said horn being formed with an inner margin running from its point towards the middle of said disk, and means for conveying the sheet acted upon by said disk and horn towards the assembling apparatus.

9. In a machine for assembling folded sheets, the combination, with the assembling apparatus, of a frame adapted to support a pile of folded sheets, a member adapted to be passed between the first sheet and the body of the pile placed on said frame and to relieve the said first sheet of the pressure of the pile, gripping means operative before inserting said member between said sheet and body of the pile for engaging the said sheet near one corner and separating the same from the body of the pile, said gripping means having substantially elliptical movement, and means for conveying the sheet engaged by said member towards the assembling apparatus.

10. In a machine for assembling folded sheets, the combination, with the assembling apparatus, of a frame for supporting a pile of folded sheets, means for engaging the sheets near one corner thereof and bending the same in opposite direction relatively to the pile, and means adapted to engage the bent corner of the sheet and to convey the same towards the assembling apparatus.

11. In a machine for assembling folded sheets, the combination, with the assembling apparatus, of a frame adapted to support a pile of folded sheets, means adapted to engage the sheets at the corner remote from the assembling apparatus and to bend the same away from the pile, a pair of feed rollers in position for engaging the bent corner of the sheet, one of said rollers being formed with a recess in position for receiving the said corner of the sheet, a finger rotatable within said recess relatively to the roller, the rotary movement of said finger being timed so that the finger engages the corner of the sheet supplied thereto and bends the same into position for engagement by the rollers, and conveying means for feeding the folded sheet from said rollers to said assembling apparatus.

12. In a machine for assembling folded sheets, the combination, with the assembling apparatus, means for feeding a folded sheet to said assembling apparatus, and a sheet splitting device located in the path of the sheets being fed to the assembling apparatus and comprising a pair of blades spaced from each other and disposed in position for passing between the branches of the folded sheet being fed to the assembling apparatus, said assembling apparatus comprising a sheet inserting knife movable between said blades for engaging a folded sheet split thereby.

13. In a machine for assembling folded sheets, the combination, with the assembling apparatus, of means for conveying a folded sheet substantially in the direction of the diagonal thereof and with its folds forwardly, and a splitting apparatus located in the path of the doubled folds of said sheet and comprising a pair of spaced blades adapted to engage between the said doubled folds of the sheet being fed, said assembling apparatus comprising an inserting knife adapted to be passed between said blades into position for engaging the sheet.

14. In a machine for assembling folded sheets, the combination, with the assembling apparatus, of means for conveying a folded sheet substantially in the direction of the diagonal thereof and with its folds forwardly, a splitting apparatus located in the path of the doubled folds of said sheet and comprising a pair of spaced blades combined at the side of the sheet being conveyed thereto into a point and adapted to engage between the said doubled folds of the sheet being fed, and means operative before said blades for separating the double folds from each other, said assembling apparatus comprising an inserting knife adapted to be passed between said blades into position for engaging the sheet.

15. In a machine for assembling folded sheets, the combination, with the assembling apparatus, of a pair of means for conveying folded sheets towards said assembling apparatus, and pairs of spaced splitting blades one for each of said conveying means adapted to engage the sheets between the folded parts thereof, said assembling apparatus comprising an inserting knife successively movable between said pairs of blades and adapted first to engage one sheet at its fold and to convey the same between the folds of the second sheet being placed on its blades.

16. In a machine for assembling folded sheets, the combination, with the assembling apparatus, of means for conveying folded sheets towards said assembling apparatus, splitting blades adapted to engage between the folds of the sheets being fed, said conveying means comprising a pair of feed rollers, and means for separating the said feed rollers from each other when the sheet is in assembling position.

17. In a machine for assembling folded sheets, the combination, with the assembling apparatus, of means for conveying folded sheets towards said assembling apparatus, splitting blades adapted to engage between the folds of the sheets being fed, said conveying means comprising a pair of feed rollers, means for separating the said feed rollers from each other when the sheet is in assembling position, and a stopping member adapted to be moved into position for stopping the sheet being conveyed into assembling position.

18. In a machine for assembling folded sheets, the combination, with the assembling apparatus, of means for conveying folded sheets towards the assembling apparatus with their folds forwardly, rockable fingers adapted to be moved into the path of the sheet arriving in assembling position, and operating means for said fingers adapted to set the same into stopping position and to retract the same before the assembling apparatus engages the sheets.

19. In a machine for assembling folded sheets, the combination, with the assembling apparatus comprising an inserting knife, of means for conveying a folded sheet into assembling position, means for separating the folded parts of the sheet, and means for elevating the fold of the sheet into position for engagement with said knife.

20. In a machine for assembling folded sheets, the combination, with the assembling apparatus comprising an inserting knife, of means for conveying a folded sheet into assembling position, a table on which the sheet being conveyed is supported, and a hinged member forming a part of the table and adapted to be lifted with the fold of the sheet into position for engagement with the inserting blade.

21. In a machine for assembling folded sheets, the combination, with the assembling apparatus comprising an inserting knife, of means for conveying a folded sheet into assembling position, a table on which the sheet being conveyed is supported, a hinged member forming a part of the table and adapted to be lifted with the fold of the sheet in position for engagement with the inserting blade, and a yielding member cooperating with said hinged member for yieldingly holding the sheet on said member.

22. In a machine for assembling folded sheets, the combination, with the assembling apparatus comprising a movable inserting knife for assembling the sheets, of means for taking the assembled sheets from said knife, said means comprising a rotary gripping device having a path intersecting the path of said knife and having a velocity greater than that of the knife, and means for closing said gripping device on the assembled sheets when intersecting the path of said knife and for opening the same at a point remote from the path of the inserting knife.

23. In a machine for assembling folded sheets, the combination, with the assembling apparatus comprising a movable inserting knife for assembling the sheets, of means for taking the assembled sheets from said knife, said means comprising a rotary disk the margin of which intersects the path of said knife, a rockable gripping member mounted on said disk, and a stationary cam disk controlling the movement of said gripping member and adapted to rock the same into position for clamping assembled sheets on said disk and for releasing the said sheets at a part remote from the path of said knife.

24. In a machine for assembling folded sheets, the combination, with the assembling apparatus, of means for taking the assembled sheets from said assembling apparatus, of pairs of means for conveying the assembled sheets in opposite directions from said assembling apparatus, and means for throwing the said pairs of conveying means alternately into operation.

25. In a machine for assembling folded sheets, the combination, with sheet-conveying members and assembling apparatus, of a plurality of pairs of means alternately cooperating with said assembling apparatus for conveying the assembled sheets in opposite directions from said assembling apparatus, a pair of electrical contact pieces borne by the sheet-conveying members first named and in the absence of a conveyed sheet adapted in the progress of operation to make contact, and means controlled by the making of such contact for shifting the pairs of means first named.

26. In a machine for assembling folded sheets, the combination, with sheet-conveying members, and assembling apparatus, of additional means for conveying the assembled sheets, electrical means for rendering ineffective the conveying means last named, the circuit of said electrical means including a pair of cooperating contacts provided on cooperating parts of the sheet-conveying members first named and adapted to close the circuit as operation progresses when a sheet fails to pass between the said parts.

27. In a machine for assembling folded sheets, the combination, with the assembling apparatus comprising a movable assembling knife, of a plurality of means for conveying sheets into the path of said knife, a plurality of means located at different parts of the path of said knife for removing the assembled sheets from the knife, and means for throwing one of said removing means out of operation.

28. In a machine for assembling folded sheets, the combination, with the assembling apparatus, and means for conveying folded sheets, of a frame for supporting a pile of sheets with the individual sheets inclined at an acute angle to a vertical plane and comprising a plate adapted to be engaged by the first sheet of the pile near one corner thereof and bars adapted to be engaged by the edges of the piled sheets, means disposed at the corner of the first sheet remote from said plate for taking the first sheet from the pile and transmitting the same to said conveying means.

29. In apparatus for assembling folded paper, means for supporting a pile of folded sheets in oblique position with a corner of the pile extending beyond the supporting means, means adapted to engage the so extending corner of the lowermost sheet and to move it away from the next superior sheet in the pile, a separating wedge adapted to enter between the lowermost sheet and the next superior sheet of the supported pile and cooperating means adapted to engage the deflected corner of the lowermost sheet and to remove the lowermost sheet from the pile.

30. In apparatus for assembling folded paper, means for supporting a pile of folded sheets in oblique position with a corner of the pile extending beyond the supporting means, a paper-engaging needle movable in cyclic course and adapted to engage from beneath and to move downwardly the so extending corner of the lowermost sheet, a separating wedge adapted to enter between the lowermost sheet and the next superior sheet of the supported pile, and cooperating means adapted to engage the deflected corner of the lowermost sheet and to remove the lowermost sheet from the pile.

31. In apparatus for assembling folded paper, means for supporting a pile of folded sheets in oblique position with a corner of the pile extending beyond the supporting means, a separator in the form of a helical wedge rotatable on an obliquely disposed axis and adapted to enter between the lowermost sheet of a supported pile and the next superior sheet, and cooperating means adapted to engage the so separated sheet and to convey it from the pile.

In testimony whereof I hereunto affix my signature.

FRIEDRICH HEPP.